(No Model.) 2 Sheets—Sheet 1.
J. J. WEICHER.
MACHINE FOR EXTRACTING FIBER FROM FIBROUS PLANTS.
No. 506,866. Patented Oct. 17, 1893.
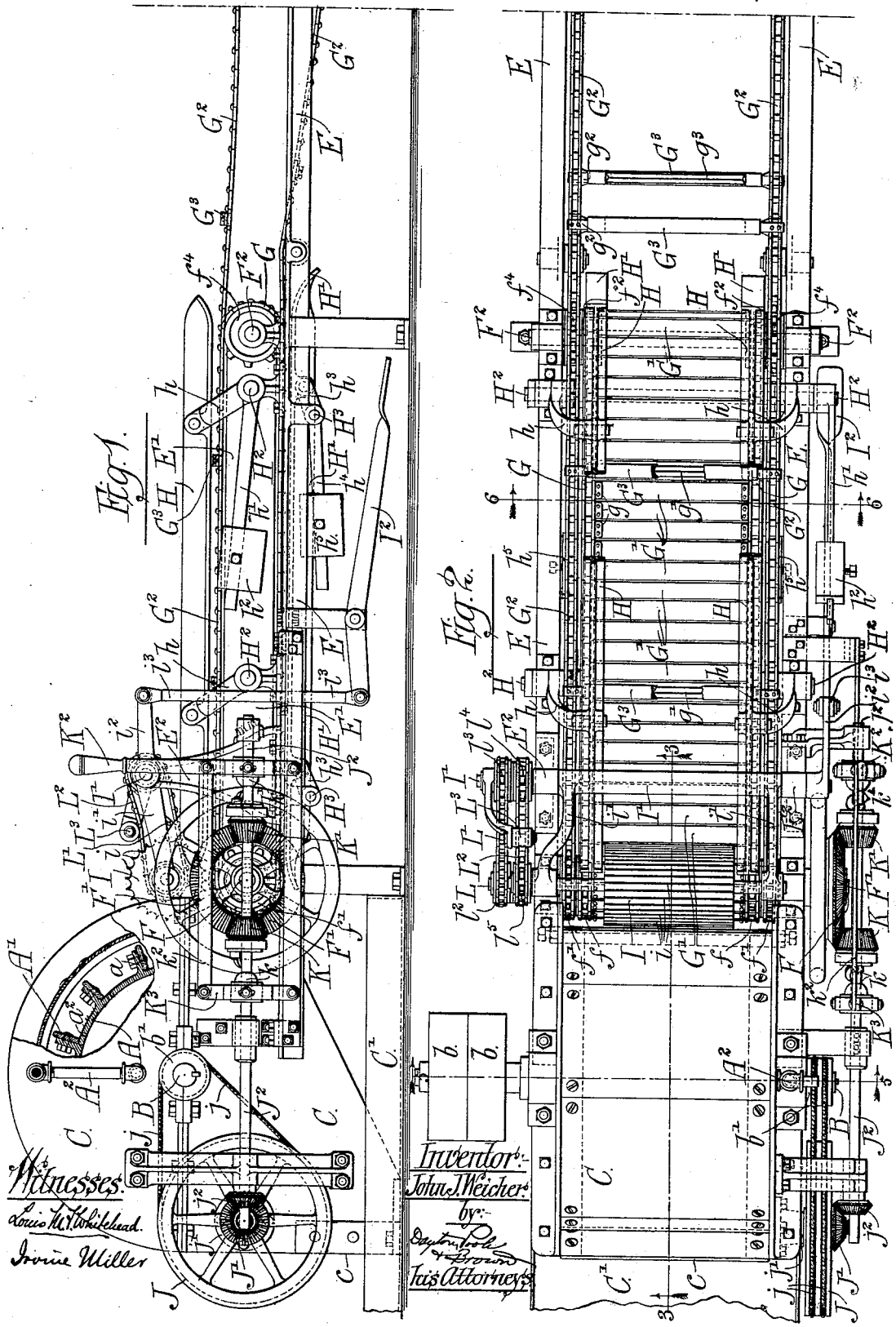

(No Model.) 2 Sheets—Sheet 2.
J. J. WEICHER.
MACHINE FOR EXTRACTING FIBER FROM FIBROUS PLANTS.
No. 506,866. Patented Oct. 17, 1893.
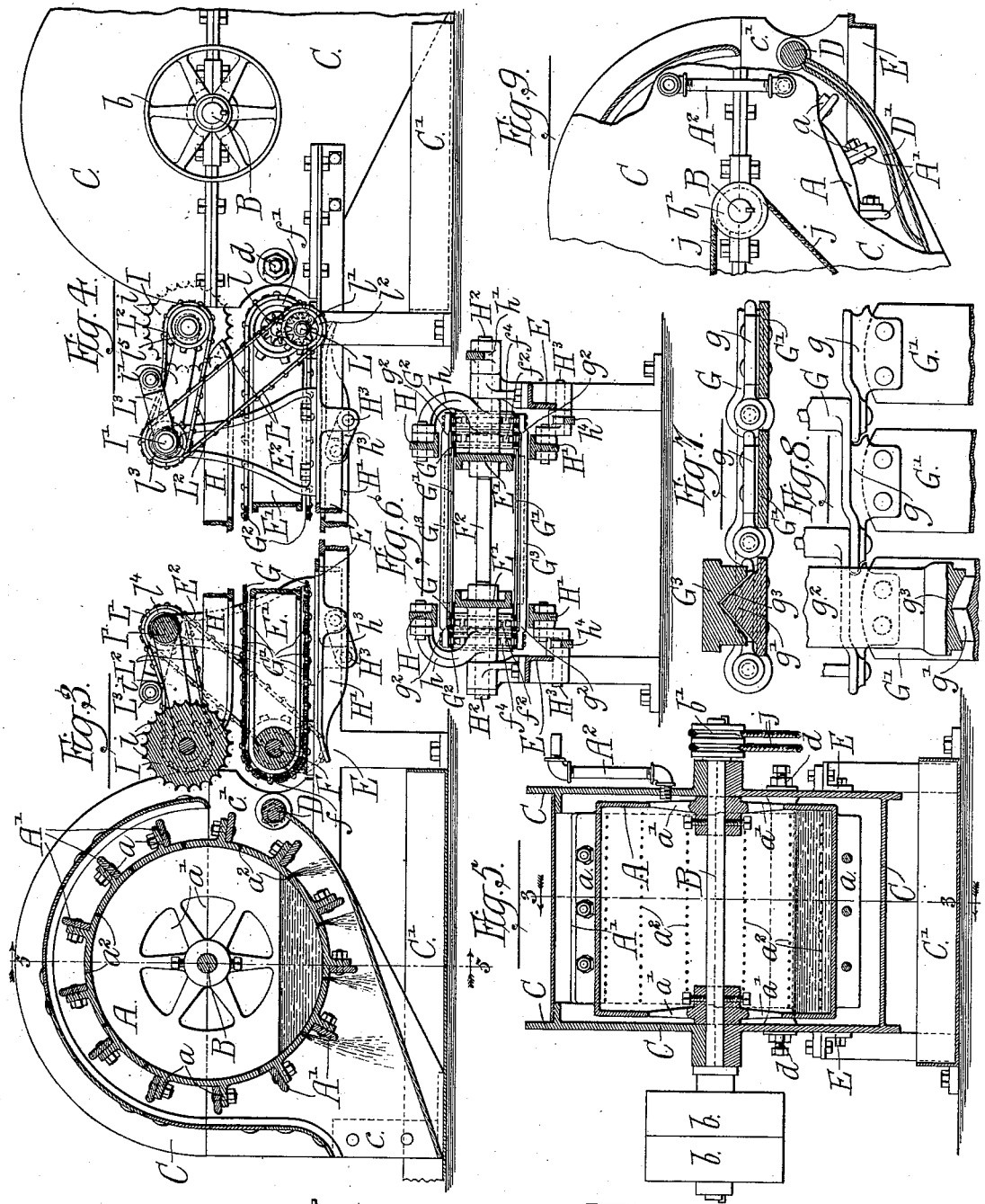
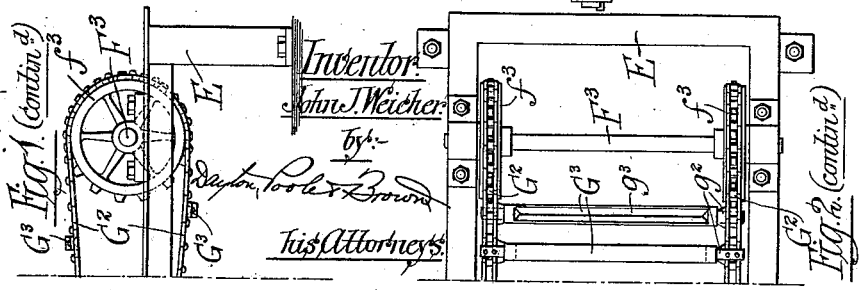
Witnesses:
Louis M. F. Whitehead
Irvine Miller
Inventor:
John J. Weicher
by:—
Dayton, Poole & Brown
his Attorneys

UNITED STATES PATENT OFFICE.

JOHN J. WEICHER, OF CHICAGO, ILLINOIS, ASSIGNOR TO THE AMERICAN FIBER EXTRACTING COMPANY, OF SAME PLACE.

MACHINE FOR EXTRACTING FIBER FROM FIBROUS PLANTS.

SPECIFICATION forming part of Letters Patent No. 506,866, dated October 17, 1893.

Application filed June 1, 1891. Serial No. 394,669. (No model.)

*To all whom it may concern:*

Be it known that I, JOHN J. WEICHER, of Chicago, in the county of Cook and State of Illinois, have invented certain new and useful Improvements in Machines for Extracting Fiber from Fibrous Plants; and I do hereby declare that the following is a full, clear, and exact description thereof, reference being had to the accompanying drawings, and to the letters of reference marked thereon, which form a part of this specification.

My invention relates to machines for extracting fiber from fibrous plants, and has for its object to provide a machine whereby the fiber of such plants may be rapidly, effectually and economically separated from the pulp thereof.

To this end my invention consists in certain novel features which I will now proceed to describe, and will then particularly point out in the appended claims.

In the accompanying drawings: Figure 1 is a side elevation of a machine embodying my invention, a portion of the casing being broken away to show the internal construction. Fig. 2 is a plan view of the same, parts of the clamping devices of the feeding mechanism being broken away. Fig. 3 is a detail sectional view taken on the line 3—3 of Figs. 2 and 5. Fig. 4 is a detail side elevation of a portion of the side of the machine opposite to that shown in Fig. 1. Fig. 5 is a transverse sectional view taken on the line 5—5 of Figs. 2 and 3. Fig. 6 is a transverse sectional view, taken on the line 6—6 of Fig. 2. Fig. 7 is an enlarged detail longitudinal section of a portion of the feeding and clamping mechanism. Fig. 8 is a plan view of the same. Fig. 9 is an elevation, partly in section, illustrating a modification of the water supply.

In the said drawings, A represents a drum, secured on a shaft, B, mounted in suitable bearings in a casing, C, inclosing said drum. The drum A is hollow, and is provided on its outer periphery with a plurality of blunt knives or scrapers, A', which are arranged transversely of the drum and extend radially outward therefrom. The knives are connected with the drum by being bolted to radial projections, $a$, formed thereon, and by this construction the knives may be readily detached and replaced when necessary.

Water is supplied to the interior of the drum A from any suitable source by means of a pipe, $A^2$, extending through the casing C and terminating opposite one of the side openings, $a'$, of the drum. There are formed through the periphery of the drum a plurality of apertures, $a^2$, through which the water thus introduced passes out of the drum.

The shaft B is provided at one end with fast and loose pulleys, $b$, to receive the belt by means of which the machine is driven, and at the other end with a pulley, $b'$, hereinafter referred to.

The casing C is open at its rear lower portion, as shown at $c$, and is provided with a drip tray, C', to catch the water and pulp as it comes from the opening $c$. In the front side of the casing C is a transverse opening, $c'$, through which the fibrous material is introduced into the interior of the casing.

Immediately subjacent to the opening $c'$ is located a stationary support D, which has preferably the form of a round bar or elongated cylinder, having its ends mounted in the sides of the casing C and secured by nuts, $d$. The ends of the bar are eccentric to the body thereof, as indicated in dotted lines, so that, as the bar becomes worn, it may be rotated slightly to maintain a fixed distance between the working surface thereof and the knives.

The mechanism for feeding the fibrous material to the drum and support is mounted upon an elongated frame, E, extending forward from the opening $c'$ of the casing. On the rear end of this frame is mounted in suitable bearings a transverse shaft F provided near each end with two pairs of sprocket wheels, $f$, $f'$, and at about the middle of the frame E is mounted, in suitable bearings, a second transverse shaft, $F^2$, provided at its ends with sprocket wheels, $f^2$, in line with the sprocket wheels $f$ and sprocket wheels, $f^4$, in line with the wheels $f'$.

At the front end of the frame E is located a third transverse shaft, $F^3$, provided at its ends with sprocket wheels $f^3$, arranged in line with the sprocket wheels $f'$. G, G are sprocket chains arranged one on each side of the machine and passing over the sprocket wheels $f f$ and $f^2 f^2$ on their respective sides. Each link of these chains is provided with an inwardly projecting lug, $g$, and to each opposite pair of lugs is secured a transverse slat, G', these slats forming as a whole an endless moving table or bed. At suitable intervals along this bed or table one of the slats G' is provided with a V-shaped rib or projection, $g'$, which forms one member of one of the sets of clamping jaws.

$G^2$ $G^2$ are sprocket chains arranged just outside the chains G G and passing over the sprocket wheels $f'$ $f'$, $f^4$ $f^4$ and $f^3$ $f^3$. At distances corresponding with the distances separating the ribs $g'$ the sprocket chains $G^2$ $G^2$ are connected by transverse slats or bars, $G^3$, each having arched end portions, $g^2$, extending over the inner chains G, and having its inner face provided with a V-shaped groove or depression, $g^3$, to correspond and coact with the ribs $g'$. These slats form the other members of the sets of clamping jaws above referred to.

As a means for maintaining the slats G' and $G^3$ in engagement with each other and of causing them to co-act as clamping jaws, I have provided guide bars E' mounted within the endless bed on the shafts F', $F^2$ and $N^2$ and engaging with their upper and lower edges the inner sides of the slats G' to limit the inward movement of the same under external pressure; and above and below said guides E', I provide guide-bars H and H' engaging the outer sides of the slats $G^3$ and serving to limit the outward movement of the same, each pair of slats G' and $G^3$ passing, in turn, between the upper edges of the guide E' and the upper guides H and between the lower surface of each of said guides E' and the lower guides H'. Said slats will thereby be held in close proximity to each other and necessarily if a portion of fibrous material be placed between them it will be securely held. In this instance and as a further improvement the guides are adapted to afford yielding pressure on the slats, the outer guides H and H' being, to this end respectively supported at the outer ends of pivotal arms $h$, $h^3$ the inner ends of which are attached to transverse shafts $H^2$, $H^3$ mounted in suitable bearings on the frame E. Radial arms $h'$, $h^4$ respectively are also attached to the shafts $H^2$, $H^3$ and are provided with adjustable weights $h^2$, $h^5$ tending to rotate the said shafts and consequently to press the guides H, H' yieldingly against the slats $G^3$ with a pressure which will be greater or less according as the weights $h^2$, $h^5$ are adjusted nearer to or farther from the outer ends of their supporting arms $h'$, $h^3$.

I indicates a roller, mounted above the bed or table formed by the slats G' at a point immediately over the shaft F. This roller is of considerable weight, and is preferably grooved or fluted transversely to form comparatively sharp ribs, $i$, as shown. It is mounted to revolve in bearings in the ends of arms, $i'$, secured to or formed on an elevated transverse rock-shaft, I', mounted in uprights, $E^2$, on the frame E. One end of the shaft I' has secured on it an arm, $i^2$, which is connected by means of a link, $i^3$, with a foot lever, $I^2$, by means of which the roller I may be forcibly depressed when desired.

The feed mechanism described is actuated in the following manner. The shaft B is, as already stated, provided at one end with a pulley $b'$, and over this pulley pass ropes, $j$, which serve to drive a large pulley, J, mounted on a stub-shaft, $j'$. On the hub of the pulley J is a bevel gear, J', with which meshes a bevel-gear, $j^2$, on a longitudinal shaft, $J^2$, at one side of the machine. On the shaft $J^2$ are loosely mounted two bevel pinions, K and K' which mesh with opposite sides of a bevel-gear, F', on one end of the shaft F. Clutches $k$ and $k'$, splined on the shaft $J^2$, serve to connect either one of the pinions K and K' with said shaft $J^2$ to rotate along with the same. These clutches are simultaneously operated to cause them to engage and disengage their respective pinions by means of a hand lever, $K^2$, connected directly with the clutch $k'$, and connected with the clutch $k$ through the medium of a link, $k^2$, and secondary lever, $K^3$. By this means rotary motion in either direction may be imparted to the shaft F, or the said shaft may be allowed to remain stationary. The other end of the shaft F is provided with a pinion, $l$, which meshes with a pinion, $l'$, on a short shaft, L, mounted in bearings on the frame E. This shaft L is provided with a sprocket wheel, $l^2$, over which passes a sprocket chain, L'. The chain L' passes over a sprocket wheel, $l^3$, loose on the rock-shaft I', and $l^4$ represents a second sprocket wheel also loose on the rock-shaft I' and connected with the sprocket-wheel $l^3$ to rotate therewith. The shaft of the roller I is provided with a sprocket wheel, $l^5$, over which and over the sprocket wheel $l^4$ passes a sprocket chain, $L^2$. By this means the roller I is positively driven in such a direction that that portion thereof opposite the bed formed by the slats G' moves in the same direction as said bed, but at a higher rate of speed.

$L^3$ represents a tightener to keep the sprocket chain $L^2$ taut.

The machine thus organized operates in the following manner: The drum A rotates at a high rate of speed, while the sprocket wheels which actuate the feeding and clamping mechanisms move at a comparatively low rate of speed. The water supplied to the interior of the hollow drum A issues forcibly therefrom through the apertures $a^2$ by centrifugal force, and provides the necessary water supply at the fixed support and throughout the casing. Let it be supposed that the fibrous material to be operated upon is comparatively thin, as in the case of plant leaves or the like. These leaves are placed upon the bed or table formed by the slats G, with their forward ends upon one of the ribs $g'$ and their bodies extending thence rearward toward the drum A. The feeding devices are then started by causing the clutch $k$ to engage the bevel pinion K through the medium of the hand lever $K^2$ and its connections, when motion will be imparted to the sprocket-chains G, $G^2$, and to the endless bed formed by the slats G' and also to the slats $G^3$, the uppermost portion of these devices moving toward the drum A. As the slats G', $G^3$ pass between the guides E and H they are pressed together and the fibrous material is clamped and held between them, the clamping being rendered more firm by reason of the V-shaped rib and groove with which said parts are respectively provided. The fibrous material is thus carried rearward, passing under the roller I, the periphery of which moves in the same direction with and at a higher rate of speed than the bed of the slats, so that said roller serves to direct the material toward the opening $c'$ in the casing and insure their entrance lengthwise into the same. The said roller also serves to crush the fibrous material and prepare it for further treatment, its effectiveness to this end being materially increased by the sharp transverse ribs $i$ with which it is provided. The portion of the fibrous material, as it enters the opening $c'$ in the casing, extends over the fixed support D and is subjected to the action of the blunt knives or scrapers A' on the drum A, between which and the fixed support they are acted upon, being broken down and abraded thereby in the presence of a water supply, whereby the pulp is separated from the fiber, the pulp being washed or carried away by the water through the opening $c$ of the casing, while the fiber is carried forward by the undermost portion of the feeding mechanism, being still clamped between the slats G' $G^3$ by the action of the under presser-bars H'. At a point under the shaft $F^2$, the slats G' $G^3$ separate and the fiber is discharged.

In case the machine is to operate on fibrous material of considerable bulk or thickness, such as the large stems of plants or the like, the said material may be operated upon a portion at a time in the following manner: After a portion of the material has been operated upon by the knives A' of the drum A, the direction of motion of the feeding mechanism is reversed by so moving the lever $K^2$ as to disengage the clutch $k$ from the bevel pinion K and engage the clutch $k'$ with the bevel pinion K'. This reversal of the feeding motion withdraws the material from the casing, and after such withdrawal the material is again fed forward by a second reversal, this operation being repeated as often as necessary until the free portion of the material is freed from pulp. This mode of extracting the pulp by degrees prevents clogging of the machine and enables the machine to operate successfully upon fibrous material of large dimensions. The pressure exerted by the roller I upon the fibrous material as it lies on the moving slats may be increased or diminished as desired by pressure upon the foot lever $I^2$.

It is obvious that various modifications in the details of the construction shown and described may be made without departing from the principle of my invention. For instance, I have shown, in Fig. 9, a modified arrangement of the water supply, in which the pipe $A^2$, instead of discharging into the interior of the drum, discharges into the casing at a point between the drum and fixed support D, and slightly above this latter. In this case it may be desirable to employ a second pipe similar to the pipe $A^2$ on the opposite side of the machine. In this connection I have also shown a supporting plate or bed, D', extending downward from the support D and adapted to hold the material in position to be operated upon by the knives A' throughout its length. It will thus be seen that I do not limit myself strictly to the precise details hereinbefore described and shown in the drawings.

What I claim is—

1. In a fiber-extracting machine, the combination, with a revoluble drum provided with projecting knives or scrapers, of a stationary support adjacent thereto, composed of a round bar provided with eccentric ends by which it is adjustably held.

2. In a fiber extracting machine the combination with a hollow revoluble drum provided with projecting knives or scrapers and having a plurality of outlet apertures in its cylindric wall and a plurality of inlet apertures in one of its end walls, said inlet apertures being arranged concentrically about the axis of the drum, of a water supply pipe in proximity to said end wall at one side of the axis of the drum and opposite said inlet apertures, said supply pipe being directed toward said inlet apertures and adapted to discharge a jet of water through said inlet apertures into the drum, substantially as described.

3. In a fiber extracting machine the combination with an endless feeding table provided with clamping slats at intervals, of sprocket chains having co-operating slats at corresponding intervals and oppositely arranged guides for engaging each pair of slats and maintaining the same in proximity to each other, substantially as described.

4. In a fiber extracting machine the combination with an endless feeding table provided with clamping slats at intervals, of longer sprocket chains moving in unison therewith, and having co-operating clamping slats at corresponding intervals and oppositely arranged guides for engaging each pair of slats and for pressing the same together with a yielding pressure, substantially as described.

5. In a fiber extracting machine the combination with an endless feeding table provided with clamping slats at intervals, of sprocket chains moving in unison therewith, and having co-operating clamping slats at corresponding intervals, and oppositely arranged guides for engaging each pair of slats and for pressing the same toward each other with an adjustable yielding pressure, substantially as described.

6. In a fiber extracting machine the combination with an endless feeding table provided with clamping slats at intervals, of sprocket chains moving in unison therewith and provided with co-operating clamping slats at corresponding intervals, guides located between the opposite moving portions of the endless bed, oppositely arranged guides exterior to the endless bed and means for pressing one set of guides yieldingly toward the other set whereby each pair of slats will be yieldingly pressed together in passing between the guides, substantially as described.

7. In a fiber extracting machine the combination with an endless bed provided with clamping slats at intervals, of sprocket chains moving in unison therewith and having co-operating clamping slats at corresponding intervals, guides located between the oppositely moving portions of the endless bed, oppositely arranged guides exterior to the endless bed and means for pressing one set of guides yieldingly toward the other set with adjustable pressure whereby each pair of slats will be yieldingly and adjustably pressed together in passing between the guides, substantially as described.

8. In a fiber extracting machine, the combination with an endless bed provided with clamping slats at intervals, of sprocket chains moving in unison therewith and having co-operating clamping slats at corresponding intervals, guides located between the oppositely moving portions of the endless bed, oppositely arranged guides exterior to the endless bed, and radial arms supporting the exterior guides and having a pivoted engagement with the main frame whereby each pair of slats will be yieldingly pressed together as they pass between the guides, substantially as described.

9. In a fiber extracting machine the combination with an endless bed provided with clamping slats at intervals, of sprocket chains moving in unison therewith and having co-operating clamping slats at corresponding intervals, guides located between the oppositely moving portions of the endless bed, oppositely arranged guides exterior to the endless bed, radial arms supporting the exterior guides transverse shafts pivotally mounted on the machine frame and to which said arms are attached, other radial arms also attached to said shafts and adjustable weights on the latter arms, whereby each pair of slats will be pressed together with an adjustable yielding pressure as they pass between the guides, substantially as described.

10. In a fiber extracting machine a combination with an endless bed provided with clamping slats at intervals, of a sprocket chain, having co-operating clamping slats at corresponding intervals, and guides located between the oppositely moving portions of the endless bed, engaging with their upper and lower edges the inner sides of the clamping slats thereof, and oppositely arranged exterior to the endless bed above and below the same, whereby each pair of slats will be maintained in proximity to each other in passing between the guides, substantially as described.

11. In a fiber-extracting machine, the combination, with sprocket chains provided with clamping devices, as described, and a driving shaft for said chains provided with a bevel gear, of a counter shaft having loose bevel pinions thereon to mesh with opposite sides of said bevel gear, clutches splined on said shaft and adapted to respectively engage said pinions, and a hand lever and secondary lever connected to move in unison and engaging said clutches to move the same into engagement or disengagement.

12. In a fiber extracting machine the combination with a revoluble drum provided with knives or scrapers, and a stationary support adjacent thereto, of an endless bed or table provided with clamping devices for holding the fibrous material and having one of its ends adjacent to said drum and support, and means moving in the same direction and at a higher rate of speed than the endless bed or table and arranged above said adjacent end of the same for directing the fibrous material over said stationary support into position to be acted upon by the knives or scrapers, substantially as described.

13. In a fiber extracting machine the combination with a revoluble drum provided with knives or scrapers, and a stationary support adjacent thereto, of an endless bed or table having one of its ends adjacent to said drum and support, and a positively actuated roller arranged above the said adjacent end of the endless bed or table and having a higher surface speed than that of said bed or table, substantially as described.

14. In a fiber-extracting machine, the combination, with a revoluble drum provided with knives or scrapers and a stationary support adjacent thereto, of an endless bed or table provided with clamping devices, substantially as described, and having one of its ends adjacent to said drum and support, a positively actuated roller arranged in operative proximity to said endless bed or table at said end and mechanism for rotating said roller at a peripheral speed higher than the speed of the bed or table.

15. In a fiber-extracting machine, the combination, with a revoluble drum provided with knives or scrapers, and a stationary support arranged adjacent thereto, of an endless bed or table provided with clamping devices, substantially as described, and having one of its ends adjacent to said drum and support, a positively actuated roller arranged in operative proximity to said end of the bed or table, and means for pressing said roller toward the bed or table.

16. In a fiber extracting machine the combination with a revoluble drum provided with knives or scrapers and a stationary support adjacent thereto, of an endless bed or table provided with clamping devices, and having one of its ends adjacent to said drum or support, a positively actuated roller arranged in operative proximity to said end of the endless bed or table, a rock shaft provided with arms in which said roller is journaled and a foot lever for oscillating said rock shaft, substantially as described.

17. In a fiber-extracting machine, the combination, with an endless bed or table and a driving shaft therefor provided with a gear wheel, of a counter shaft provided with a gear wheel to mesh therewith and having a sprocket wheel, a roller above the bed or table, having a sprocket wheel on its shaft, a rock-shaft having arms in which said roller is journaled, connected sprocket wheels mounted loosely on said rock-shaft, a sprocket chain connecting one of said sprocket wheels with a counter-shaft sprocket wheel, and a second sprocket chain connecting the other of said sprocket wheels with the sprocket wheel on the roller shaft.

18. In a fiber extracting machine the combination with a revoluble drum provided with knives or scrapers and a stationary support adjacent thereto, of an endless bed or table provided with clamping devices and having one end adjacent to said drum and support and a positively actuated roller provided with longitudinal ribs and arranged above the said adjacent end of the endless bed or table and having a surface speed greater than that of said bed or table, substantially as described.

In testimony that I claim the foregoing as my invention I affix my signature in presence of two witnesses.

JOHN J. WEICHER.

Witnesses:
C. CLARENCE POOLE,
IRVINE MILLER.